March 31, 1942.   E. C. BURDICK ET AL   2,277,681
PRESSURE MEASURING INSTRUMENT
Filed Jan. 17, 1940
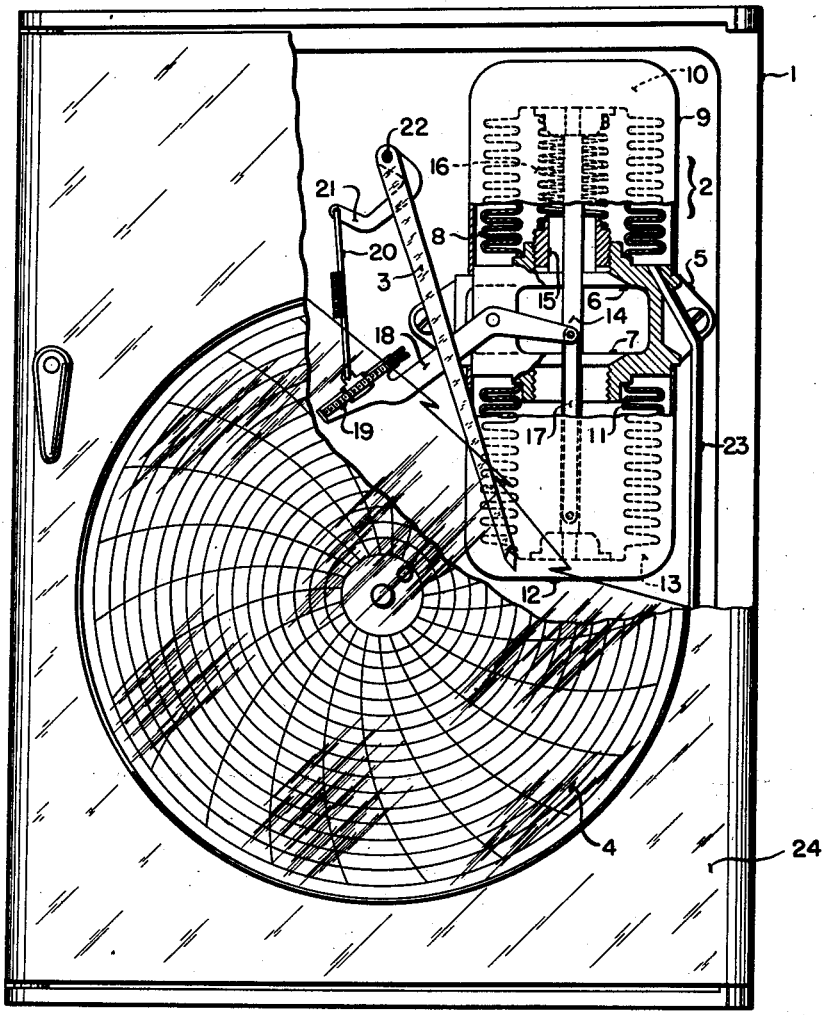
INVENTOR
EDWIN CLARK BURDICK
ROY ULLMAN
BY
ATTORNEY Patented Mar. 31, 1942

2,277,681

UNITED STATES PATENT OFFICE 2,277,681

PRESSURE MEASURING INSTRUMENT

Edwin Clark Burdick, Philadelphia, and Roy Ullman, Roslyn, Pa., assignors to The Brown Instrument Company, Philadelphia, Pa., a corporation of Pennsylvania Application January 17, 1940, Serial No. 314,292

2 Claims. (Cl. 73—110)

This invention relates to apparatus for measuring and/or controlling pressure.

An object of the invention is to provide an instrument which will measure absolute pressure, said instrument being provided with means to compensate for the ambient, or atmospheric pressure at the measuring instrument.

Another object of the invention is to provide an instrument, comprising a measuring element connected with a recording or indicating element through a linkage, the leverage of which is substantially constant for all positions of the elements.

Another object of the invention is to provide such a linkage which may be adjusted to vary the pressure range of the instrument.

Previous instruments of the type described have employed various means for linking the pressure responsive elements and the indicating element, but inaccuracies of measurement have occurred due to unequal displacements of the indicating element for equal increments of pressure in different parts of the scale. These unequal displacements have been found to originate in varying leverage in the links between the measuring element and the indicating element. Such conditions have been avoided in the invention herein disclosed.

While we describe our invention herein as being used in a recording instrument, it will be obvious that suitable control instrumentalities may be actuated if desired.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which we have illustrated and described a preferred embodiment of the invention.

The single figure of the drawing shows an absolute pressure measuring instrument embodying our invention, operating the pen arm of a recorder mechanism, the whole mounted in a case having parts thereof broken away to provide a clear view of the device.

The device is shown as mounted in a suitable case 1, having a door 24, and consists of a pressure responsive element generally indicated at 2, which operates, through suitable linkage, a pen arm 3 across a chart 4, which may be driven by any suitable mechanism, not shown.

The pressure responsive element is mounted in the case 1 on a support 5, to the opposite edges of which are attached base members 6 and 7. The base member 6 has attached to it, on the side away from the support 5, a bellows 8 and a cap member 9, forming between them a chamber 10. Likewise, the base member 7 has attached to it a bellows 11, and a cap member 12, to form a chamber 13. The free ends of the bellows 8 and 11 are connected by a rigid link 14, which passes through openings in the base members 6 and 7. Threadedly attached to the base member 6 is a spring perch 15, which freely surrounds the link 14, and serves as an abutment for one end of a spring 16, the other end of which bears against the end wall of bellows 8. In operation the chamber 13 is evacuated and the pressure or vacuum to be measured is applied to the chamber 10 through a hollow tube 23.

Near one end of the link 14 is pivoted a link 17, the other end of which is pivoted to the end of the short arm of a bellcrank lever 18, that is in turn pivoted about a point on the center line of the support 5. The long arm of the lever 18 is provided with a screw 19 which adjustably receives a pivot member attached to one end of a link 20. The other end of link 20 is pivoted to an arm 21 which is rigid with a shaft 22 carrying the pen arm 3.

The atmospheric pressure acts on the interior of bellows 11, and thereby tends to move link 14 downward, as it appears in the drawing. The same atmospheric pressure, however, acts on the interior of bellows 8, tending to move link 14 upward. These two forces cancel each other, and the position of link 14 is therefore independent of changes in atmospheric pressure. The spring 16 serves to balance the natural resilience of the bellows 8 and 11 and serves to shift the zero point of the instrument. If, for example, the instrument is to be used for a range of zero absolute pressure to atmospheric, the pressures acting on the various bellows may be as follows (a) outside of bellows 11, zero, (b) inside of bellows 11, atmosphere, (c) outside and inside of bellows 8, atmosphere for full scale position of the pen 3. Therefore, the point of connection between link 17 and lever 18 will be in some given position. If this position is such that the pen is off of the chart or not to the full scale gradation thereof the spring 16 may be adjusted by rotation of 15 to shift link 14 in the proper direction to properly position the pen. Thereafter as the pressure in chamber 10 is reduced the link 14 will be moved toward that chamber until zero pressure is reached, at which time the pen should be at the zero gradation mark on the chart 4.

Since it is practically impossible to produce bellows which will all have exactly the same amount of expansion for given pressure changes, provision is made to vary the sensitivity of the instrument so that the pen may, in practice, be made to move across the chart the same amount for equal pressure changes. Such an adjustment is a calibration adjustment and may be made by shifting the end of link 20 along the screw 19 to vary its distance from the pivot point of lever 18. In this manner the link 20 and pen arm 3 are moved a greater or less distance for a given angular movement of lever 18.

In order to change the range of the instrument a different sized spring 16 may be used. If, for example, a stronger spring is used the range of the instrument will be increased since a greater pressure is needed on the exterior of bellows 8 in order to move link 14 toward chamber 13 far enough to bring the pen 3 to the full scale position on chart 4.

The proportions of the lever 18, link 20, and arm 21 are such that the movement of lever 18 through a very small angle will cause a full scale deflection of the pen arm 3. The short arm of the lever 18 is short in comparison with the link 17, and long in comparison with the range of motion of the rod 14, so that the angle between these two elements is substantially a right angle, for all positions of the pen arm 3 on the scale of the chart 4. Therefore, the force applied through the link 17 to the end of the lever 18 is substantially tangential to the path of motion of the latter throughout the range of the instrument. The mechanical advantage of the linkage is accordingly substantially constant.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a measuring instrument the combination of a support having a pair of aligned openings, a pair of bellows attached to said support, the interior of said bellows communicating with said openings, a pair of cup-shaped members surrounding said bellows and attached to said support whereby chambers are formed between said bellows and cup-shaped members, means to subject said chambers to different pressures, a spring between said support and the interior of one of said bellows to bias the same to a normal position, a rigid connecting member extending through said openings and attached at its ends to the inner ends of said bellows, an exhibiting element, a pivoted lever connected to move said element, one arm of said lever extending between said openings and terminating adjacent the center of said rigid connecting member, and a link connected at one end to the end of said arm and at its other end to one end of said connecting member, the length of said arm being so proportioned relative to the movement of the connecting member that the angle between said link and arm remains substantially the same.

2. In a measuring instrument a pair of oppositely disposed chambers, a bellows extending into each chamber and forming a movable wall thereof, a connecting member attached to the ends of said bellows to move lengthwise upon variations in length of said bellows, an exhibiting member, a pivoted lever connected to move said exhibiting member, one arm of said lever extending between said chambers to a point beside said connecting member, and a link attached at one end to one end of said connecting member and at its other end to said arm the lever arm being of such a length relative to the total movement of said connecting member that the angle between said arm and link remains substantially the same whereby said link moves substantially parallel to said connecting member as the latter is shifted.

EDWIN CLARK BURDICK.
ROY ULLMAN.